US005098581A

United States Patent [19]

Roediger

[11] Patent Number: 5,098,581

[45] Date of Patent: Mar. 24, 1992

[54] METHOD AND DEVICE FOR THE GENERATION OF FINE GAS BUBBLES IN A LIQUID

[76] Inventor: Walter Roediger, Castillostrasse 6, D-6380 Bad Homburg v.d.H., Fed. Rep. of Germany

[21] Appl. No.: 532,324

[22] Filed: Jun. 5, 1990

[30] Foreign Application Priority Data

Jun. 5, 1989 [DE] Fed. Rep. of Germany ....... 3918307

[51] Int. Cl.[5] ............ C02F 1/72

[52] U.S. Cl. ............ 210/758; 210/101; 210/221.1; 261/122; 261/124

[58] Field of Search ............ 210/101, 220, 221.1, 210/221.2, 758; 261/122, 124

[56] References Cited

U.S. PATENT DOCUMENTS 4,060,486 11/1977 Schreiber ............ 210/220
4,169,050 9/1979 Serfling et al. ............ 210/220 X
4,478,766 10/1984 Horikita et al. ............ 210/221.2 X
4,563,277 1/1986 Tharp ............ 210/220
4,581,137 4/1986 Edwards ............ 210/220
4,606,867 8/1986 Eguchi ............ 261/122
4,640,784 2/1987 Cant ............ 210/221.2 X
4,714,545 12/1987 Bente et al. ............ 210/101
4,960,546 10/1990 Thorp ............ 261/122

*Primary Examiner*—Charles Hart
*Attorney, Agent, or Firm*—Cushman, Darby & Cushman

[57] ABSTRACT

In order to generate fine gas bubbles in a liquid, aeration elements (12) arranged in the bottom area of a basin (10) are applied with gas via a gas feeding conduit (14). The aeration elements are part of the gas feeding conduit. The weight of the aeration elements together with the gas feeding conduit is chosen in such a way, that special fixation elements for the gas feeding conduit are not necessary.

36 Claims, 5 Drawing Sheets

METHOD AND DEVICE FOR THE GENERATION OF FINE GAS BUBBLES IN A LIQUID

BACKGROUND OF THE INVENTION

1. Field of the Invention

The invention is related to a device for the generation of fine gas bubbles in a liquid within a basin, especially wastewater, comprising at least one aeration element having a basis element with a gas diffusor which has passage openings for gas, and where each specific space between the gas diffusor and the area of the basis element facing said diffusor can be applied with gas streaming via at least one gas feeding conduit. Furthermore, the invention refers to a method for the generation of fine gas bubbles in a liquid.

2. Description of the Related Art

In the standard area aeration in general, the basis elements are fixed on the gas feeding conduits installed in a fixed position on the bottom of the basin. In order to secure an even gas input it has to be guaranteed that the gas feeding conduits are aligned parallel to the surface of the liquid. Otherwise, pressure differences would result which would lead to different gas diffusions so that the aerobic wastewater treatment would not have the desired and especially not the energetically efficient extent. Therefore, corresponding installations to be in use up to now are not only disadvantageous in regard to their assemblage, but also in regard to a readjustment of the level height of the individual basis elements. Heretofore, with aeration basins for wastewater treatment, hundreds of conduit fixations and thousand or more basis elements per basin have to be carefully installed in a very time consuming way by reliable persons. This work is especially inconvenient, because it has to be executed in a squatting position and, what is more, with both hands, in a distance of only a few cm over the basin bottom, which serves as an assembling surface. Furthermore, the level of the air emerging surface has to be subsequently readjusted exactly to the level of the wastewater which will later be approximately 5 meters higher than the level of the air emerging surface. The wastewater basins are usually filled with water a few cm above the level of the air emerging surface, as a level for comparison, so that for readjustment the necessity to work in the water adds to the difficulty of assemblage. The known area aerations have as a general principle a uniform screen in regard to the installed gas diffusors. After installation, a change is impossible. The same applies, as a general principle, prior to the assemblage since the single elements, i.e. sections of the gas feeding conduits and the gas diffusors, which have to be connected with the sections, always have to be installed as provided in the pre-planning.

SUMMARY OF THE INVENTION

It is an object of the present invention, among others, to develop a device of the above described kind in such a way, that an unproblematic assemblage and adjustment of height is possible. Especially, an even and allover input of gas should be put into practice, which is mostly without a more than unessential circulation of the liquid content, since circulations of the liquid cause unnecessary losses of energy. Also, the possibility should be provided, to minimize the distance between the basis element and the basin bottom in order to avoid the deposition of sludge beneath the gas diffusion-device. Further, a simple fixation of the gas diffusors should be guaranteed, especially with, as seen from a top view, rectangle shaped basis elements arranged closely next to each other. It should be possible to install the aeration elements, if given, during the assemblage at desired locations without the necessity to dislocate the gas feeding conduits or to change sections of the conduits. A further object to enable the necessary input of gas, which depends on the needed oxygen, without significant time delays. Finally, accumulated liquid in the gas feeding conduit especially condensation water should be divertable. Condensation water should be kept away unproblematically.

According to the present invention the problem is solved mainly in that the position of the gas feeding conduits are fixed or maintained by the aeration element in the basin, especially on the basin bottom. The basis elements are sections of the gas feeding conduits which run along the basin bottom.

The present invention differs from the prior art in that the position of the gas feeding conduits are not fixed by special fixation elements. In the present invention, a simple assemblage and height adjustment of the basis elements is achieved.

In the present invention the gas feeding conduits and the aeration elements are not separate elements any more. Rather, desired sections of the gas feeding conduit are selected as basis elements, on which gas diffusors of suitable construction can be attached in order to provide in this area the diffusion of the liquid with fine gas bubbles.

Heretofore, it has been provided, according to a suggestion which has to be pointed out, that the gas feeding conduit has a slightly domed upper surface with free longitudinal edges for the fixation of a section of the gas diffusors. With an embodiment relating to this, it is furthermore only necessary that the front areas of the gas diffusors, which run vertically along the longitudinal direction of the gas feeding conduit on said conduit, are tightly fixed on the upper surface in such a way, that an uncontrolled gas discharge does not occur.

There are several possible ways of connecting or fixing the gas diffusors to the gas feeding conduit. For example, sections of the longitudinal edges of the gas feeding conduits can be placed into corresponding allocated grooves of the gas diffusor. The size of the groove section of the gas diffusor which runs along the lower side of the longitudinal edge is chosen in such a way, that a relative motion between the gas diffusor and the upper surface of the gas feeding conduit does not cause the edge of said conduit to slip out of the groove. Furthermore, the front area of the gas diffusor lies tightly on the upper surface of the gas feeding conduit. The front areas of the gas diffusor can be material strengthened or they can be provided with a tension producing armoring. It is also possible that a clamp element running along the front areas interacts with the gas feeding conduit. Finally, the necessary tension to secure a tight fitting in the front areas can be produced by making the part of the gas diffusor, which is removed from the gas feeding conduit, not as wide in its front areas as in its middle area.

Another possibility provides that in the basis element the longitudinal side of the gas feeding conduit has longitudinal grooves into which edge sections of the gas diffusor can be placed.

The passage openings for gas of the gas diffusor can be produced by slotting or needle punching. Therefore, the material of the gas diffusor is, preferably, not as thick in the area of the passage openings for gas than in the other areas.

The gas diffusor can also consist of porous material. The material has a porosity which corresponds to the bubbling-through of gas into the wastewater according to the $O_2$ need required by the wastewater.

The gas feeding conduit itself has preferably an elliptical cross-section with a plane bottom surface. Hereby it is guaranteed, that the surface from which the gas diffusor emanates has a convex flexion in order to secure the even gas input that is need through the passage openings. The plane bottom surface secures the tight lying of the gas feeding conduit on the bottom surface of the wastewater basin.

In order to control the gas input to the needed extent, gas inlet openings are provided in the end areas of the gas feeding conduit. Preferably, there are two gas inlet openings with different cross-sections in one end area and one opening in the other end area. The latter opening can serve as a gas inlet opening as well as a discharge opening especially for condensation water.

The total gas distribution can naturally be controlled by the two ends of the gas feeding conduit whereby it is guaranteed, that via each gas diffusor the desired gas quantity is provided with constant pressure. By the arrangement of the gas inlet openings in the end areas of the gas feeding conduit an easy control is possible. A maximal gas input results, if gas is feed over all openings. By blocking single openings, the gas input can be reduced. The connections to the openings can be provided with magnetic valves in order to allow an unproblematic on/off switch. The magnetic valves are controlled according to the amount of oxygen required by the liquid to be aerated. The amount of oxygen needed can be determined through the use of oxygen excess probes.

Furthermore, the accumulated condensation water in the gas feeding conduit can be discharged via an opening. This can result, if the pressure of the gas input exceeds the hydrostatical pressure for the condensation water. Naturally, magnetic valves at the conduit porting above the liquid are then needed to either discharge condensation water or to feed gas.

The opening provided for the discharge of condensation water can be provided, according to an embodiment of the invention, with a floating element which releases the conduit when a certain quantity of condensation water is accumulated. Naturally, this floating element releases the opening also during the input of gas through the opening.

Preferably, the gas is cooled off outside the gas feeding conduit. This way the gas feeding conduit can be connected to a main distribution conduit, arranged at least partially in the wastewater, thereby the gas to be feed to the gas feeding conduit can be cooled off. This construction has the advantage that the temperature of the gas bubbling-through into the wastewater is so low that it is suitable for the solution of the $O_2$. Furthermore, arrangements for the discharge of the condensation water from the gas feeding conduits are not necessary.

According to an embodiment of the invention, the conduits leading to the ends of the gas feeding conduit running along the basin bottom can be parts of a lifting device in order to provide for unproblematic lifting, and lowering.

Aluminum products are suitable as the material for the gas feeding conduit. These can, if needed, be placed into holding devices which are provided on the basin bottom and work as guiding elements, in order to guarantee that the desired position in the water is not altered during the operation. Recyclable material are also suitable.

Of course, the gas feeding conduit itself or elements emanating from the conduit are chosen in regard to their density in such a way that even when gas is applied the density of the liquid is smaller. Therefore, fixation elements on the basin bottom are not necessary.

In order to adjust the height of the individual sections of the gas feeding conduit and the gas diffusors wedge elements are provided, according to an additional embodiment emanating from the basin bottom. The wedge elements interact with the gas feeding conduit, in such a way that the necessary level adjustment can be achieved.

Naturally it is also possible to divide the gas feeding conduits into single sections which are connectable via a plug-type connection. Hereby, it is possible to arrange the single sections in a row and use prefabricated single elements. The single sections can be covered to the desired extent by gas diffusors in order to provide the needed number of aerators.

Furthermore, the invention refers to a method of gas input into a liquid within a basin, especially wastewater, with aeration elements or area gas diffusors mainly arranged in rows running parallel to each other. The method is characterized by the input of the gas via bubbling-through and that the bottom area is to a large extent diffused with gas bubbles throughout. Thus, the circulation of the wastewater is largely prevented. Bubbling-through means that the ascending gas bubbles are like pearls arranged in a row but physically separated from each other, each having a diameter which is preferably approximately smaller than 0.2 mm. The oxygen can thereby dissolve very well in the wastewater. Therefore, the process proceeds in an energetically favorable manner.

In order to exclude the deposition of sludge between the rows it is suggested, that the rows are applied with gas one after the other. This results in a foreward driving of the sludge by the production of a gush, through which on one hand the unwanted depositions are avoided and on the other hand enough sludge remains active within the basin so that an additional energy input for the forward driving of sludge is not necessary.

Finally, different rows can be provided with gas to different extents whereby a fast adjustment to each specific oxygen need is given at the same time.

Other objects, features and characteristics of the present invention, as well as the methods of operation and functions of the related elements of the structure, and the combination of parts and economies of manufacture, will become apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENT

Figure 1:
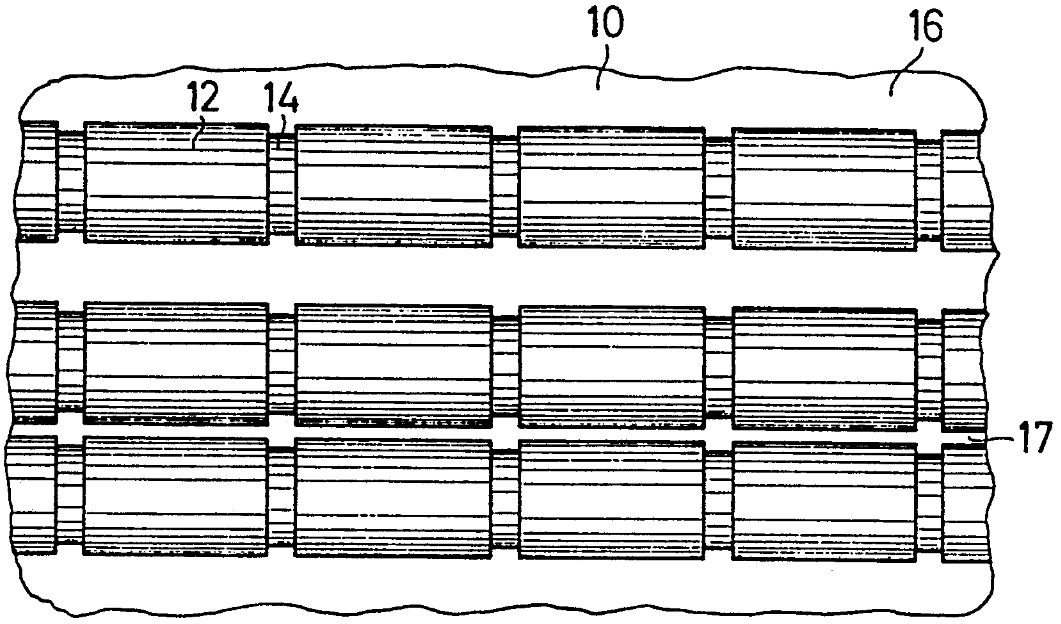
FIG. 1 is a top view of a section of an aeration basin in the bottom area.

Aeration elements (12), which can be fed with gas via a gas feeding conduit (14) are arranged in the bottom area of an aeration basin (10) as sectionally shown in FIG. 1. The gas feeding conduit (14) lying on the basin bottom (18), on the bottom surface (16), is provided with a gas via a conduit (56). The conduit (56) emanates from a main distributing conduit (66) which, preferably at least in sections, runs along in the wastewater in order to cool off the gas and to discharge the condensate in the main distributing conduit.

According to the invention an aeration element (12) stretches almost across the entire length of the gas feeding conduit (14). Depending on the construction it is often the case, however, that one gas feeding conduit has more aeration elements (12) than is shown in the Figures.

Figure 2:
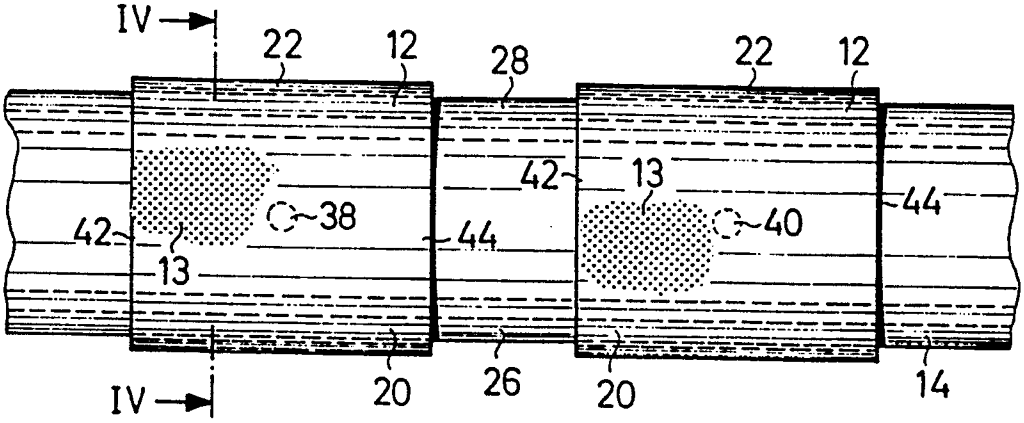
FIG. 2 is a detail drawing of a gas diffusor conduit in top view.
Figure 3:
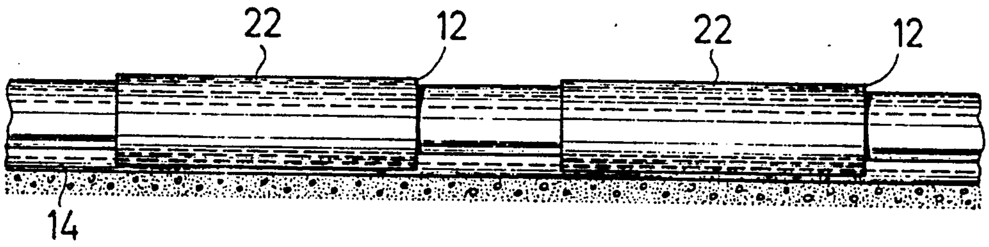
FIG. 3 is the gas diffusor conduit according to FIG. 2. in side view.

Sections of the gas feeding conduit (14) therefore are therefore basis elements (20) of the aeration elements (12) and are called aerators. Each section building a basis element (20) is covered by a gas diffusor (22). The gas diffusor (22), made of an elastic material, has perforations (13) which are preferably made by needle-punching or slotting. Naturally, the perforations (13) are merely exemplarily as shown in the FIG. 2.

Figure 4:
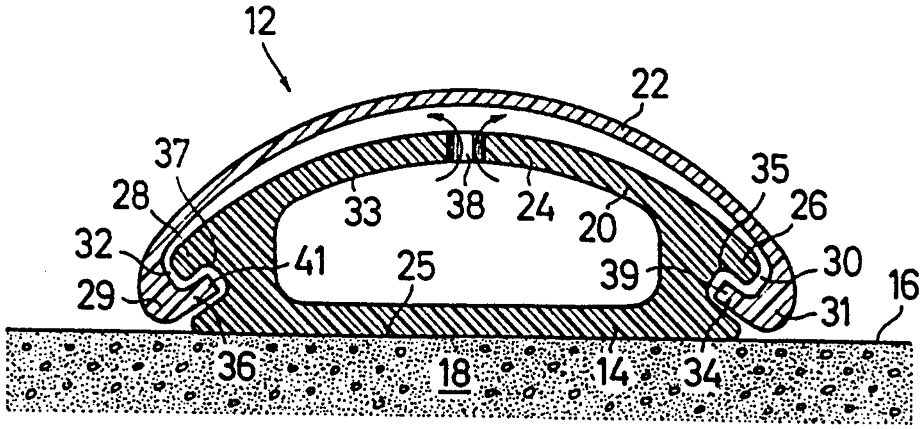
FIG. 4 is a sectional drawing along the line IV—IV in FIG. 2.
Figure 10:
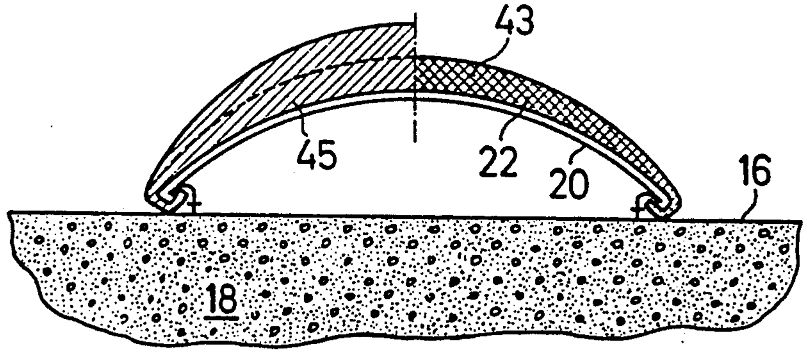
FIG. 10 is a sectional drawing of an aeration element in the front area.

A preferred embodiment to fix the gas diffusors (22) on the basis elements (20) is shown in FIG. 4 and FIG. 10.

According to FIG. 4, the aeration conduit (14) has an almost elliptical cross-section with a flat lower surface (25) and an upper surface (24) which blends into free longitudinal edges (26) and (28). Sections of the longitudinal edges (26) and (28) are placed into longitudinal grooves (30) and (32), which are in sections of the longitudinal edges of the gas diffusor (22). Thereby, the section (34) running along the lower surface of the edges (26) and (28) is developed in such a way that a slipping out of the groove (30) and (32) respectively is impossible when a relative motion between gas diffusor (22) and gas feeding conduit (14) occurs. This relative motion is produced by the gas which is fed to the gas feeding conduit (14) via openings (38) and (40) respectively, into the space between gas diffusor (22) and basis element (20). This is marked by the arrows shown in FIG. 4.

As shown in FIG. 4, but also in FIG. 10, the longitudinal edges (28) and (30) of the basis element, that is the free edges of the the upper surface (24) showing side (33) of the gas feeding conduit (14), has longitudinal grooves (35) and (37) into which the free longitudinal edges (39) and (41) of the gas diffusor (22) can be placed.

In the front areas (42) and (44) of the gas diffusor (22) clamp elements (43) can run along (right figuration in FIG. 10) which guarantee that the gas diffusor (22) is sealing by lying tightly in this area on the upper surface (24) of the gas feeding conduit (14) and the basis element (20). Other constructions are also possible. For example, the material of the gas diffusor (22) can be strengthened in the front areas (42) and (44) (strengthening (45) in the left figuration of FIG. 10), so that the needed tension is achieved in order to secure the tight fitting. Alternatively, the possibility is given to armor the front areas (42) and (44), e.g. with a flat spiral spring, whereby the needed pressure on the gas diffusor (22) in the direction of the basis element (20) is produced.

Figure 12:
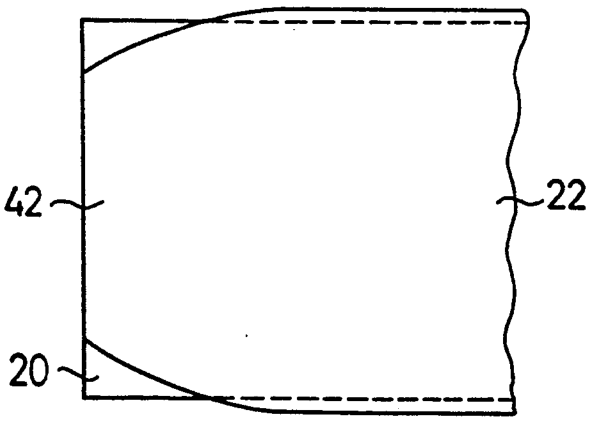
Figure 9:
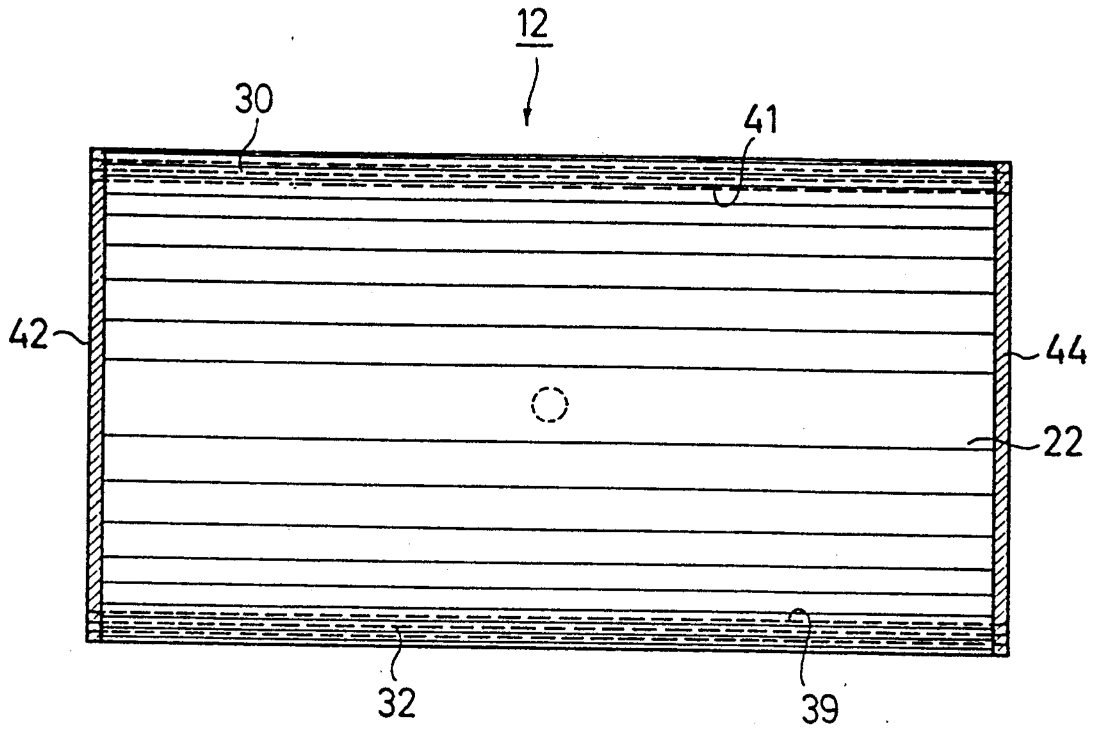
FIG. 9 is a top view of a preferred embodiment of an aeration element.

Another solution provides that the gas diffusor (22) in its relaxed state is not as wide and has, if necessary, a larger material-thickness in its front areas (42) and (44) than in its middle area (FIG. 12). As the gas diffusor (22) is lifted onto the gas feeding conduit (14) the longitudinal edges (26), (28) of the gas feeding conduit are placed into the longitudinal grooves (30), (32) of the gas diffusor (22). This results in an extension of the front areas (42) and (46) to such an extent that a tension is always produced which guarantees a secure sealing in the front areas (42) and (46) between the gas diffusor (22) and the gas feeding conduit (14).

It is shown in FIGS. 4 and 10, that the gas diffusor (22) lies with edge sections (29) and (31) on the surface of the basin bottom (16). This results in the advantage that the area of basin bottom (18) which is freely accessable between the aerators is very small so that only the smallest amounts of sludge if any at all can be deposited.

Figure 5:
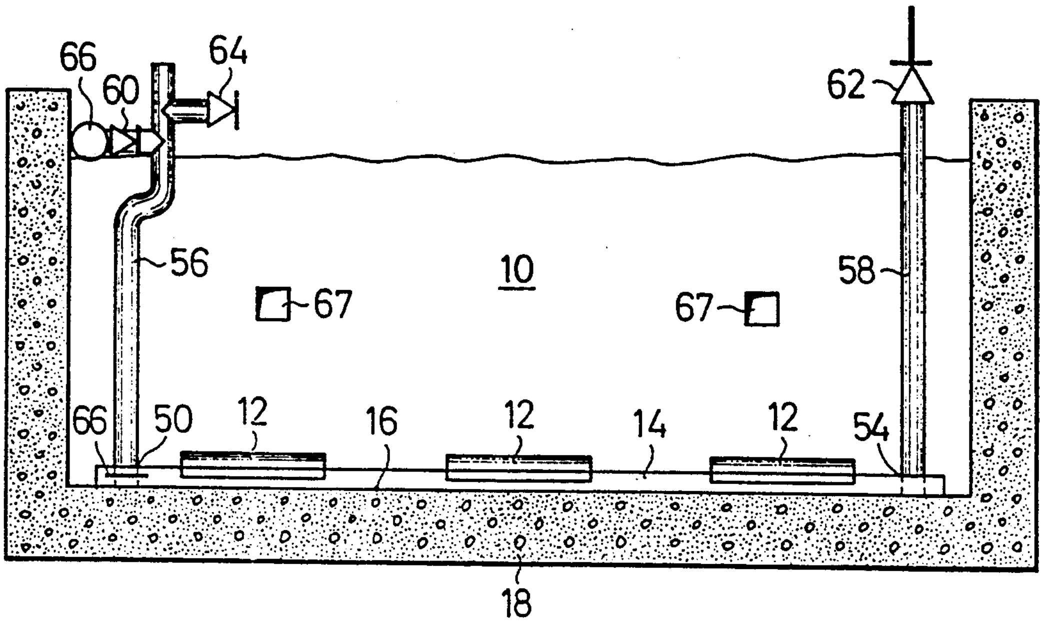
FIG. 5 is a principle drawing of an aeration basin in cross-section.
Figure 6:
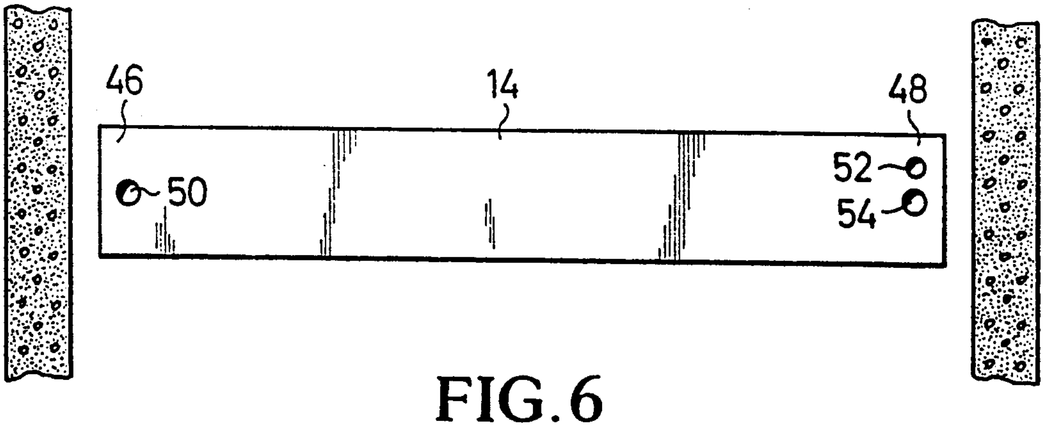
FIG. 6 is a section of the aeration basin according to FIG. 5.

Another embodiment of the present invention is shown in FIG. 5 and FIG. 6.

The gas feeding conduit (14), running along the bottom of the aeration basin (10), and as mentioned above, sections are developed as basis elements for the shield like shaped aerators (12). Each gas feeding conduit has in its end areas (46), (48) openings (50), (52) and (54) via which gas can be fed through conduits (56), (58) and a conduit (which is not shown), respectively. The gas feeding and therefore the needed oxygen input can be controlled via magnetic valves (60) and (62). The switching of the magnetic valves (60) and (62) can be programmed in order to provide optimal oxygen conditions without time delay, thus an energetically favorable operation of the basin results. The oxygen conditions can be determined, for example by oxygen excess probes (67).

Further, it is possible to discharge accumulated condensation water in the gas feeding conduit (14) via conduit (56). In this case gas is fed via openings (52) and (54) with pressure which is sufficient to push out accumulated condensation water via conduit (56) whereby the magnetic valve (60) is closed and a magnetic valve (64) is opened which emanates from conduit (56) and is connected to a side conduit which is not shown.

The opening (50) can be sealed by a merely schematically shown floating element (66). The opening (50) is released from the floating element (66) which will cause a control order, if condensation water has been accumulated to an unwanted amount. Naturally, the opening (50) is released from the floating element (66) if gas is streaming via the conduit to the gas feeding conduit (14).

However, the discharge of condensation water is considerably reduced, if the gas is cooled off before it is fed to the gas feeding conduit (14). This can be accomplished by placing at least a portion of the main distributing conduit (60) within the wastewater.

Figure 7:
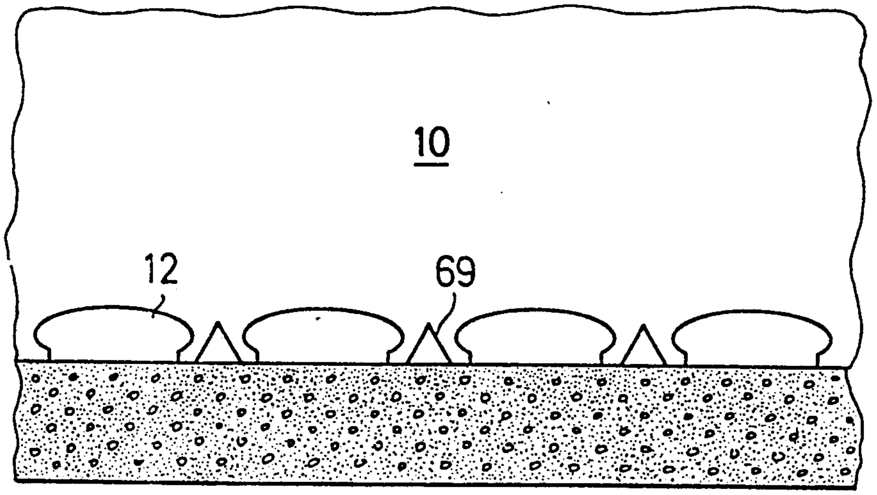
FIG. 7 is a sectional drawing in the bottom area of an aeration basin.

As shown in FIG. 7, the gas feeding conduit (14), which is made of an aluminum extruded profile, can be placed between guiding elements (69) emanating from the basin bottom (18). Thereby, it is guaranteed that the gas feeding conduits (14) run in the desired manner. Also, the positioning of the gas feeding conduits (14), when lowered into the basin (10), is made easier.

Figure 8:
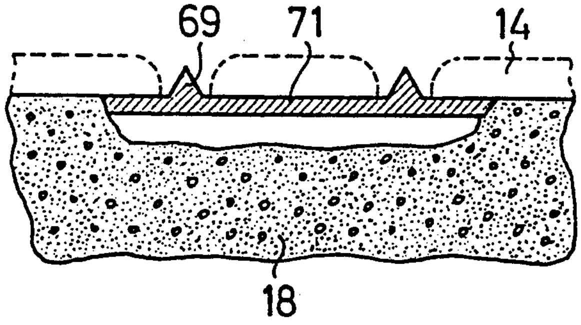
FIG. 8 is a projection of a detail in the bottom area of an aeration basin partly broken away.

The guiding elements (69), preferably cone shaped, can run along the edge areas of the basin (10) and can emanate from a ridge (71) poured into the floor (18) (FIG. 8). The ridge (71) has what is known as a "clearer flat" when the basin is grouted, with respect to the plaster floor which is casted.

The inventional teaching results in an areal coverage of the basin bottom (18) so that, as a result of this, the unwanted circulation of the liquid to be diffused with gas does not occur. The diffusion of gas takes place, so to say, in a steady liquid. Since the distance between the basin bottom (18) and the aeration conduits is almost zero, the deposition of sludge is almost excluded. Also, the ascension of the gas bubbles is regular, since it is not possible for them to be conducted along the surface of the gas diffusor like it is the case with, for example, a horizontally arranged conduit-or a candle shaped gas diffusors.

Figure 11:
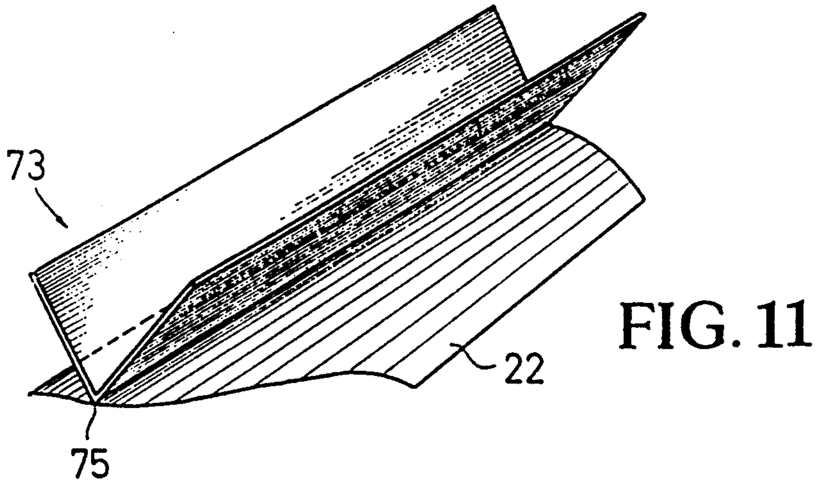
FIG. 11 is a gas distributor for an aeration element and FIG. 12 is a section of an aeration element in top view.

In FIG. 11 a bubble cluster distributor (73) with a spoiler-shaped or V-shaped geometry is shown which can be utilized, if a higher retention time of the gas bubbles in the liquid is desired. The element (73) can be connected to the gas feeding conduits (14) or the vertical running conduits (56) and (58) to the desired extent in order to achieve statical improvements. Also, the edge (75) which faces the gas diffusor (22) can serve as a stop element limiting a too strong extention of the gas diffusor (22). Through this, gas diffusors (22) with a larger surface can come into action.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A device for the generating of fine gas bubbles in a liquid within a basin comprising: at least one aeration element having a basis element and a gas diffusor, said gas diffusor has passage openings, each specific space between the gas diffusor and the area of the basis element facing said diffusor communicates with at least one gas feeding conduit, and the position of the gas feeding conduit in the basin being maintained by the aeration element.

2. A device according to claim 1, wherein the basis element is at least one section of the gas feeding conduit running along the basin bottom.

3. A device according to claim 1, wherein the gas feeding conduit lies immediately on the basin bottom.

4. A device according to claim 1, wherein the gas feeding conduit has a slightly domed upper surface with free longitudinal edges facing the gas diffusor for the fixation of at least areas of the gas diffusor.

5. A device according to claim 4, wherein the gas feeding conduit has an elliptical cross-section with free longitudinal edges.

6. A device according to claim 5, wherein an edge section of the gas diffusor running along the gas feeding conduit lies substantially tightly on the basin bottom.

7. A device according to claim 6, wherein more than one aeration element is arranged along the gas feeding conduit.

8. A device according to claim 7, wherein several gas feeding conduits run along the bottom of the basin which cover the basin bottom areally to a large extent.

9. A device according to claim 1, wherein at least one end section of the gas feeding conduit have at least one gas inlet opening.

10. A device according to claim 9, wherein two gas inlet openings with different cross-sections are provided in one end section and one opening is provided in the other end section.

11. A device according to claim 10, wherein said one opening is developed as a gas inlet opening and as a condensation water discharge opening.

12. A device according to claim 11, wherein said one opening can be sealed by a floating body, the location of said floating body depends on the amount of the accumulated condensation water.

13. A device according to claim 1, wherein the gas feeding conduit runs between a guiding element emanating from the basin element.

14. A device, according to claim 1, wherein the gas feeding conduit and elements connected to said conduit have a density when fed with gas which is higher than the density of the liquid.

15. A device according to claim 1, wherein the aeration element is shield like shaped when viewed from a top view.

16. A device according to claim 15, wherein at least one longitudinal edge of the basis element can be placed into corresponding allocated at least one groove of the gas diffusor, and the depth of said groove is chosen, in such a way, that a relative motion between said gas diffusor and said basis element does not cause the at least one edge of the gas diffusor to slip out of the at least one groove, and that at least one front area of the gas diffusor lies tightly on the upper surface of the basis element.

17. A device according to claim 15, at least one longitudinal edge of the basis element are provided with at least one longitudinal groove in which at least one free edge of the gas diffusor is fixed.

18. A device according to claim 1, wherein the gas diffusor in its front areas is material strengthened or is provided with a tension producing armoring.

19. A device according to claim 1, wherein a clamp element interacting with the basis element runs along a front area of said gas diffusor.

20. A device according to claim 1, wherein the gas diffusor, when it is removed from the basis element, has in its front areas a smaller width than in its middle area.

21. A device according to claim 1, wherein a gas permeable openings of the gas diffusor are arranged in defined distances according to the $O_2$ need required by the liquid.

22. A device according to claim 1, wherein the gas diffusor is at least partially made of a porous material and said material has a porisity which corresponds to the bubbling-through of gas into the liquid according to the $O_2$ need required by the liquid.

23. A device according to claim 1, wherein a gas bubble cluster distributor is placed above the gas diffusor.

24. A device according to claim 23, wherein the gas bubble cluster distributor is spoiler-shaped or V-shaped.

25. A device according to claim 23, wherein the gas bubble cluster distributor is a stop element limiting the extension of the gas diffusor.

26. A device according to claim 23, wherein the gas bubble cluster distributor builds at least with the gas feeding conduit a statical unity.

27. A device according to claim 23, wherein the gas bubble cluster distributor is connected to at least one conduit running along at least one side wall of the basin.

28. A device according to claim 1, wherein the gas feeding conduit is connected with a main distributing conduit which is arranged at least sectionally in the liquid so the gas to be fed to the gas feeding conduit can be cooled.

29. A device according to claim 1, wherein at least one edge section of the gas diffusor along the gas feeding conduit lies substantially tightly on the basin bottom.

30. A device according to claim 1, wherein more than one aeration element is arranged along the gas feeding conduit.

31. A device according to claim 1, wherein several gas feeding conduits run along the basin bottom and cover the bottom of the basin areally to a large extent.

32. A device according to claim 1, wherein the position of the gas feeding conduit in the basin being solely maintained by the aeration element.

33. A method of inputting gas into a liquid comprising the steps of: applying gas to aeration elements arranged in the bottom area of the liquid, inputting of gas via bubbling-through so the bottom area is to a large extent diffused with gas bubbles throughout to substantially prevent the circulation of the liquid.

34. A method according to claim 33, comprising the further step of discharging eventually deposited sludge by feeding with gas the aeration elements arranged in rows one after the other in such a way, that the sludge is moved in direction towards a basin outlet.

35. A method according to claim 33, comprising the further steps of controlling the feeding of gas, into single rows or in groups of rows of the aeration elements, by a programmatically controlled way or via oxygen excess probes.

36. A method according to claim 33, comprising the further step of largely preventing the deposition of sludge between the aeration elements by arranging the aeration elements all-over on the basin bottom.

* * * * *